(12) United States Patent
Khodorkovsky

(10) Patent No.: US 8,839,012 B2
(45) Date of Patent: Sep. 16, 2014

(54) POWER MANAGEMENT IN MULTI-GPU SYSTEMS

(75) Inventor: Oleksandr Khodorkovsky, Toronto (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 732 days.

(21) Appl. No.: 12/555,344

(22) Filed: Sep. 8, 2009

(65) Prior Publication Data

US 2011/0060924 A1  Mar. 10, 2011

(51) Int. Cl.
*G06F 1/32* (2006.01)
*G06F 15/16* (2006.01)

(52) U.S. Cl.
CPC ............. *G06F 1/3203* (2013.01); *G06F 1/3296* (2013.01); *Y02B 60/1282* (2013.01); *G06F 1/324* (2013.01); *Y02B 60/1217* (2013.01); *Y02B 60/1285* (2013.01); *Y02B 60/32* (2013.01); *G06F 1/3287* (2013.01); *Y02B 60/1278* (2013.01)
USPC ............ 713/322; 713/320; 713/324; 345/502

(58) Field of Classification Search
CPC ..... G06F 1/3203; G06F 1/3206; G06F 1/324; G06F 1/3287; G06F 1/3296; Y02B 60/1278; Y02B 60/32; Y02B 60/1217; Y02B 60/1282; Y02B 60/1285

USPC .......... 345/501, 502, 503, 504, 505; 713/300, 713/310, 320, 321, 322, 323, 324
See application file for complete search history.

(56) References Cited

U.S. PATENT DOCUMENTS

| | | | | |
|---|---|---|---|---|
| 5,615,376 | A * | 3/1997 | Ranganathan | 713/322 |
| 7,245,725 | B1 * | 7/2007 | Beard | 380/270 |
| 7,698,579 | B2 * | 4/2010 | Hendry et al. | 713/300 |
| 7,721,118 | B1 * | 5/2010 | Tamasi et al. | 713/300 |
| 7,730,336 | B2 * | 6/2010 | Marinkovic et al. | 713/320 |
| 8,102,398 | B2 * | 1/2012 | Bajic et al. | 345/503 |
| 8,233,000 | B1 * | 7/2012 | Diard | 345/502 |
| 2005/0125703 | A1 * | 6/2005 | Lefurgy et al. | 713/320 |
| 2005/0289365 | A1 * | 12/2005 | Bhandarkar | 713/300 |
| 2008/0204460 | A1 | 8/2008 | Marinkovic et al. | |
| 2008/0288748 | A1 * | 11/2008 | Sutardja et al. | 712/20 |

* cited by examiner

*Primary Examiner* — Dennis M Butler
(74) *Attorney, Agent, or Firm* — Sterne, Kessler, Goldstein & Fox P.L.L.C.

(57) ABSTRACT

A method of power management is provided. The method includes detecting an event, assign a first responsibility to a first graphics processing unit (GPU) and a second responsibility to second GPU, and changing a power state of the first and second GPUs based on the first and second responsibilities, respectively. The first responsibility is different from the second responsibility.

23 Claims, 8 Drawing Sheets

POWER MANAGEMENT IN MULTI-GPU SYSTEMS

BACKGROUND OF THE INVENTION

1. Field of the Invention

The present invention is related to multi-graphics processing unit (GPU) systems, and more particularly to saving power in multi-GPU systems.

2. Background Art

Some graphics processing systems include multiple graphics processing units (GPUs) to allow for performance gains through parallel processing of graphics tasks. For example, a graphics-intensive game may be running that requires or can benefit from having the additional processing power provided by using multiple GPUs. Other applications, however, do not benefit from such increased processing power. When these applications are being run, one or more GPUs may not be used.

In some operating systems, to save power, unused GPUs can be shut down. When the shut down GPUs are re-activated, however, the operating system often executes plug-and-play processes that diminish the user's experience. For example, switching between shut down and active states can lead to long screen freezes and flushes. Alternatively, GPUs can be left in an idle state. In the idle state, known methods, such as clock gating and power gating, can be used to decrease the amount of power that the GPU uses. These methods, however, require multiple circuit blocks of the idle GPU to remain active so that the GPU can be brought back to an active state when it is needed.

What is needed, then, are methods and systems that allow for power to be optimally saved when portions of a GPU or the entire GPU is not used.

BRIEF SUMMARY

Embodiments described herein relate to detecting power events (e.g., application starts or exits or power source changes), assigning responsibilities to different graphics processing units (GPUs) in a system based on the detected event, and changing the power states of GPUs based on the assigned responsibilities. For example, a GPU can be set to a low power state, a partially active state, or a fully active state based on the responsibilities assigned to it.

In an embodiment, a method of power management includes detecting an event, assigning a first responsibility to a first graphics processing unit (GPU) and a second responsibility to second GPU, and changing a power state of the first and second GPUs based on the first and second responsibilities, respectively. The first responsibility is different from the second responsibility.

In another embodiment, a system for managing power includes a processor and a memory in communication with said processor, the memory for storing a plurality of processing instructions for directing the processor to: detect an event, assign a first responsibility to a first graphics processing unit (GPU) and a second responsibility to second GPU, and change a power state of the first and second GPUs based on the first and second responsibilities, respectively. The first responsibility is different from the second responsibility.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1:
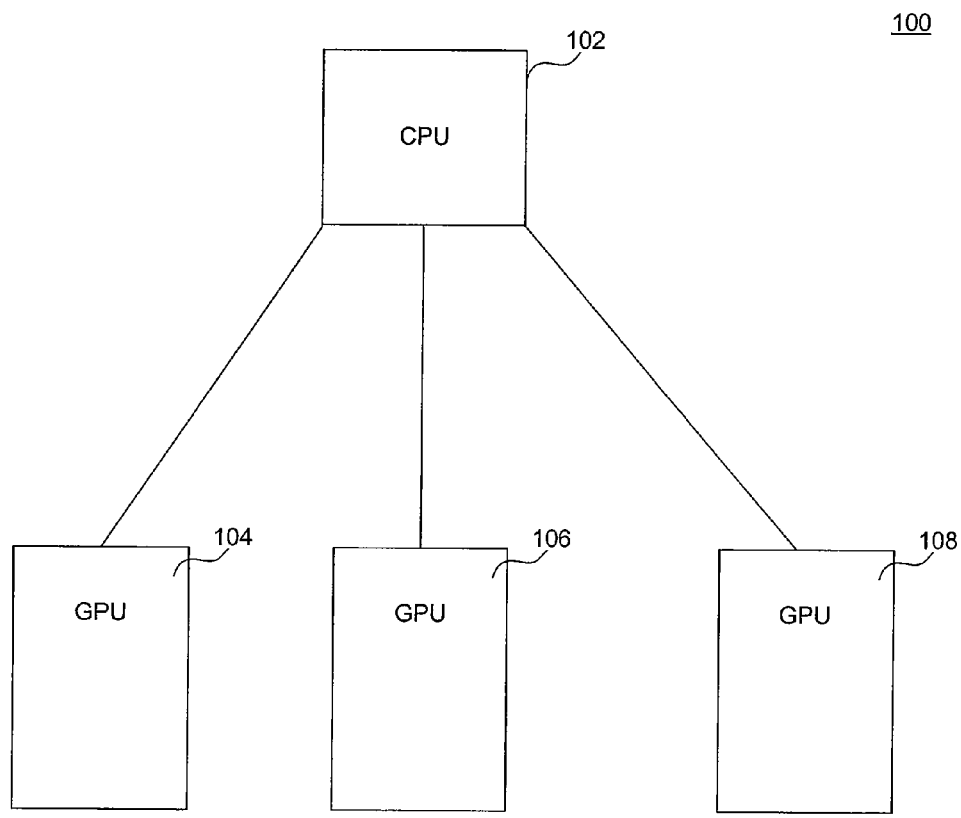
FIG. 1 shows a block diagram of a conventional graphics computing environment.

Graphics systems having multiple graphics processing units (GPUs) can provide enhanced performance over systems with a single GPU by allowing some graphics operations to be executed in parallel. For example, FIG. 1 shows a computing environment 100 that includes a central processing unit (CPU) 102 coupled to GPUs 104-108. As would be appreciated by those skilled in the relevant art(s) based on the description herein, each GPUs 104-108 may be coupled to additional components such as memories, displays, etc. GPUs 104-108 receive graphics related tasks, such as graphics processing (e.g., rendering) or display tasks, from CPU 102.

In certain situations, only some of GPUs 104-108 may be used. Some operating systems support dynamically turning graphics devices on and off. To save power in these operating systems, one or more of GPUs 104-108 can be completely shut down. The shut down and the subsequent re-activate processes, however, can result in the operating system executing plug-and-play processes that often result in visual effects detrimental to the user's experience. For example, turning the GPU on can lead to long screen image freezes and flushes.

Alternatively, one or more of GPUs 104-108 can be left in an idle state. In the idle state, clock gating and power gating can be used to decrease the amount of power that an idle GPU uses. These methods, however, require multiple circuit blocks of the idle GPU to remain active so that the GPU can be brought back to an active state when required. They also increase the cost of the device.

Thus, existing deactivation schemes for GPUs can result in degradation of the user's experience during state transitions and/or multiple portions of the GPU remaining active, decreasing the amount of power saved.

EXEMPLARY EMBODIMENTS

Some multi-GPU systems can be configured such that responsibilities within graphics tasks can be split among the multiple GPUs. For example, one GPU can be assigned for rendering and another GPU can be responsible for displaying the graphics output. When the GPU is assigned limited responsibilities, some of its circuit blocks may be unused.

If multi-GPU system includes different types of GPUs, they can work in different operating conditions. For example, a high level GPU is active when the system works from an AC power source, e.g., wall socket power which is essentially unlimited. A lower level GPU can be active when the system works from a DC power source, e.g., a battery that has limited power. Depending on the power source being used to power the system, a high level or low level GPU may be unused.

In the GPU usage scenarios mentioned above some GPU blocks or entire GPUs may be unused and switched to a state that consumes less power.

In embodiments described herein, knowledge that portions (or all) of a GPU will not be involved in any processing or functionality is used to save power without causing the negative effects described above. In response to a detected event, the GPU's responsibilities are assigned. These responsibilities can be defined in terms of GPU blocks necessary to fulfill them and blocks that will be unused. The GPU responsibilities do not change until another event is received. Therefore, the GPU, some of its internal blocks, and/or devices associated with the GPU (e.g., a memory) can be switched to a very low power state. This can be done without needing to keep significant portions of the GPU in stand-by mode as would be required in other known methods. Very low power states and other GPU states will be described in greater detail below.

Figure 2:
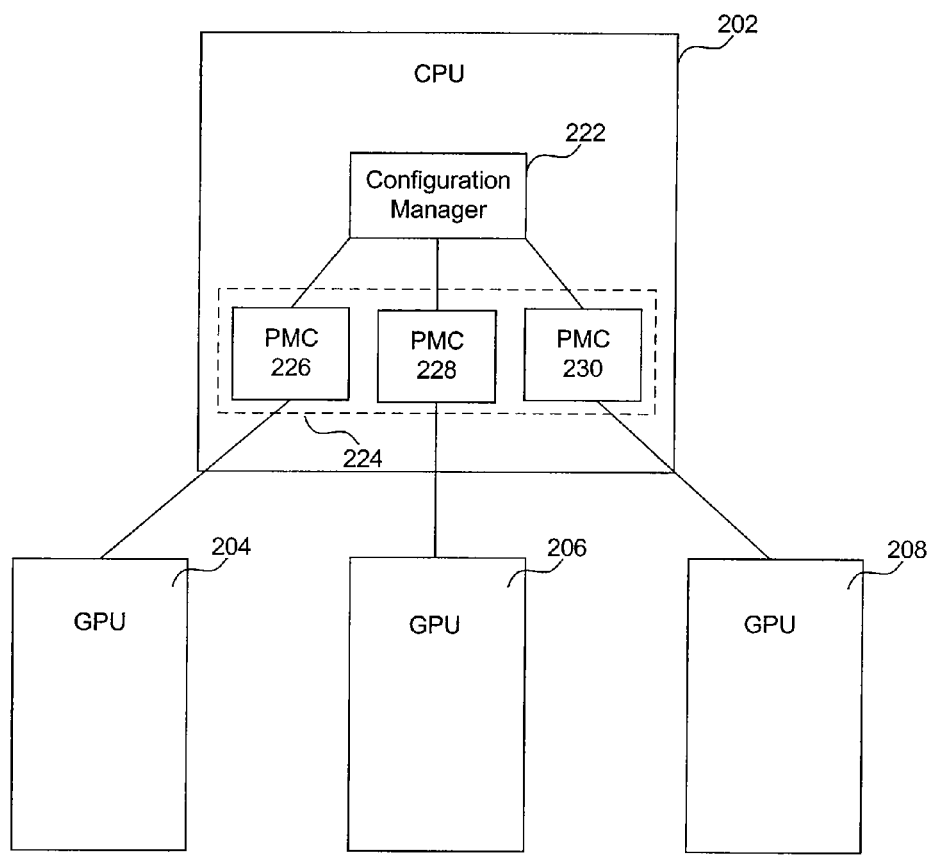
FIG. 2 shows a block diagram of a graphics computing environment, according to an embodiment of the present invention.

FIG. 2 shows a computing environment 200, according to an embodiment of the present invention. Computing environment 200 can be used in a variety of applications such as computers, hand-held devices, or any other computing device running graphics applications. Computing environment 200 includes a CPU 202 and GPUs 204-208. As would be appreciated by those skilled in the relevant art(s) based on the description herein, each GPUs 204-208 may be coupled to additional components such as memories, displays, etc.

A configuration manager module 222 and a power management module 224 both run on CPU 202. Configuration manager 222 receives information regarding detected system events (e.g., events that affect GPU responsibilities and/or power states) and assigns responsibilities to each of GPUs 204-208 and their respective associated circuit blocks. Power management module 224 receives the assigned responsibilities and determines the power state of each GPU. As shown in FIG. 2, power management module 224 can be made up of power management components (PMCs) 226-230. In an embodiment, PMCs 226, 228, and 230 correspond to GPUs 204, 206, and 208, respectively.

Each of PMCs 226-230 can set the power state of its respective GPU. For example, a PMC can set its respective GPU (and the GPU's associated devices) to a low power state, a partially active state, or a fully active state. In a low power state, the GPU and associated devices can have settings set to sub-operational levels. For example, the operating frequencies of the GPU can be substantially reduced, the operating voltage of the GPU can be set just high enough to maintain the reduced operating frequencies, circuit blocks such as phase-locked loops (PLLs) and input/output (I/O) pads can be completely shut-down, and/or memory accesses can be disabled and memory can be switched to self-refresh mode.

In a partially active state, one or more circuit blocks of the GPU can be deactivated. For example, a GPU that is used solely for display purposes can have its graphics processor and other non-display related circuit blocks in a sub-operational state, e.g., have their settings reduced to sub-operational levels as described above. In a fully active state, the GPU and associated circuit blocks are fully active.

In a further embodiment, each PMC is customized based on the power states defined for its respective GPU. For example, GPUs 204 and 206 may have different low power states, e.g., GPUs 204 and 206 may have different operating frequencies when they are switched to the low power state. PMCs 226 and 228 are aware of the defined states for GPUs 204 and 206, respectively, and thus can switch GPUs 204 and 206 to the correct low power state.

In an embodiment, CPU 202 is coupled to a memory (not shown) that stores instructions that cause CPU 202 to run configuration manager 222 and power manager 224.

FIGS. 3-13 show exemplary computing environments having GPUs that are in different power states. In an embodiment, each of the GPUs shown in FIGS. 3-13 is coupled to CPU 202 (shown in FIG. 2 and not shown in FIGS. 3-13), running configuration manager 222 and power manager 224. In particular, FIGS. 3-13 show embodiments of the operation of configuration manager 222 and power manager 224 in response to different events. In FIGS. 3-13 hatching indicates a circuit block or device that is inactive.

Figure 3:
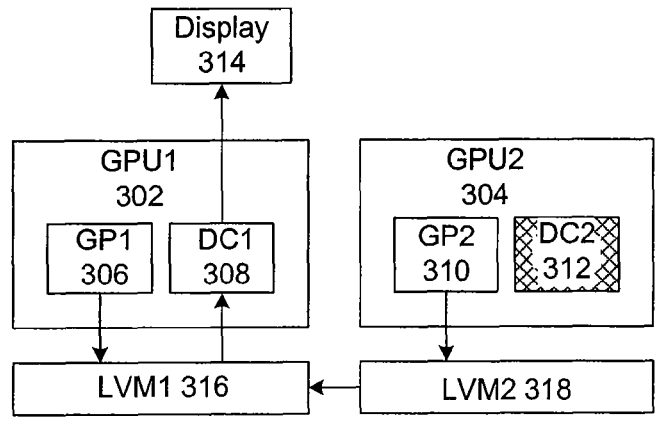
FIGS. 3-13 show block diagrams of graphics computing environments with devices having different power states, according to embodiments of the present invention.

FIG. 3 shows a computing environment 300, according to an embodiment of the present invention. Computing environment 300 includes first and second GPUs 302 and 304, first and second local video memories (LVM) 316 and 318, and a display 314. First and second GPUs 302 and 304 are coupled to first and second LVMs 316 and 318, respectively. First GPU 302 includes a first graphics processor (GP) 306 and a first display controller (DC) 308. Second GPU 304 includes a second GP 310 and a second DC 312. First DC 308 drives display 314. In an embodiment, display 314 is a monitor or other type of display device.

In the embodiment of FIG. 3, an application is running, e.g., a graphics-intensive game, that can benefit from or requires increased graphics processing capabilities. As such, first GP 306 of first GPU 302 and second GP 310 of second GPU 304 are both kept active to deliver the increased performance. As shown in FIG. 3, second DC 312 of GPU 304 is not driving a display. Thus, second DC 312 is deactivated to save power. The graphics output of second GPU 304 is be transferred to first GPU 302 by writing the output of second GP 310 to second LVM 318, copying the output from second LVM 318 to first LVM 316, and having first DC 308 access first LVM 316 when producing display content for display 314.

Figure 4:
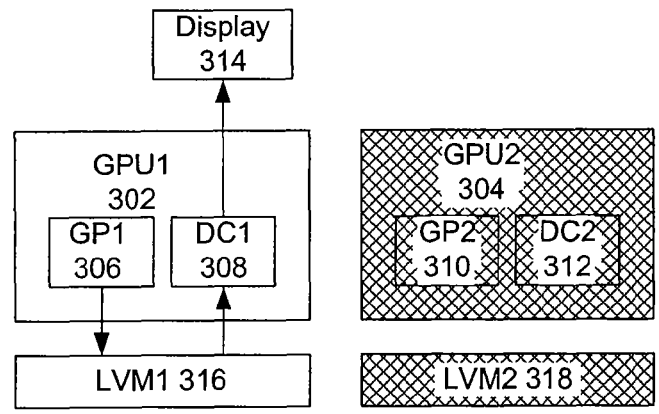

FIG. 4 shows a computing environment 400, according to an embodiment of the present invention. Specifically, computing environment 400 is similar to computing environment 300 except that a power event has been detected leading to changes in the power states of second GPU 304 and second LVM 318.

For example, configuration manager 222 receives information indicating that the application requiring or benefiting from increased graphics power in the embodiment of FIG. 3 has been or will be terminated and that no application is currently being run that can benefit from or that requires the increased graphics power provided in the computing environment 300, i.e., with two active graphics processors. In response to this application-exit system event, configuration manager 222 determines the responsibilities of first GPU 302, second GPU2 304, first LVM 316 and second LVM 318. Specifically, configuration manager 222 assigns all graphics tasks (e.g., graphics processing and display tasks) to first GPU 302 and determines that second GPU 304 and second LVM 318 will not be used.

In another embodiment, the system event can be user input. For example, a user, through a user interface, can manually specify when multiple GPUs are to be used to handle graphics processing tasks in parallel, e.g., handle multiple rendering tasks in parallel, or when power should be saved by reducing the number of active GPU circuit blocks. A system event is then generated based on the user input and configuration manager 222 assigns responsibilities to the GPUs of the system accordingly.

Decisions as to whether multiple GPUs should be active can also be made by the graphics application itself. For example, a graphics application may identify itself as being one that benefits from or requires multiple GPUs to be active. Accordingly, once it is started, the application itself can specify that multiple GPUs be available to handle graphics tasks, e.g., multiple GPUs be available to handle rendering or other graphics processing tasks.

In another embodiment, graphics tasks can be assigned to GPUs based on the capabilities of the GPUs. For example, in FIG. 2, GPU 204 may be a high performance GPU and GPU 206 may be a relatively low performance GPU. Configuration manager 222 can assign more intensive graphics tasks to GPU 204, e.g., rendering 3-dimensional graphics, and less intensive graphics tasks to GPU 206, e.g., rendering video.

The determinations made by configuration manager 222 are then passed to power manager 224. In response to the information received from configuration manager 222, power manager 224 selects power states for each of first and second GPUs 302 and 304 and first and second LVMs 316 and 318. Knowing that GPU2 304 will not be used, power manager 224 switches second GPU 304 and associated memory LVM 318 to a low power state. Power manager 224 further notifies driver components regarding the power-state transition. This ensures that unanticipated attempts to access second GPU 304 and/or second LVM 318 while they are in the low power state do not result in a system crash. The low power state can be a state in which settings of are set to sub-operational levels, as described above.

FIGS. 3 and 4 illustrate a transition between an environment providing increased graphics processing power to another environment in which power is saved by deactivating a complete GPU and its associated memory. The transition is in response to an application that requires or benefits from increased graphics processing power being terminated. As would be understood by those skilled in the relevant arts based on the description herein, the opposite transition can occur when such an application is first started. For example, computing environment 400 may represent an initial state before such an application is started. Once the graphics-intensive application is started or knowledge that such an application will be started is obtained, configuration manager 222 receives information regarding the start of the application and assigns graphics processing responsibilities to both first and second GPUs 302 and 304 and display responsibilities to first GPU 302. In response, power manager 224 determines the power states of first and second GPUs 302 and 304 and first and second LVMs 316 and 318. Specifically, power manager 224 determines that first GPU 302 and first LVM 316 should be completely active, that second GPU 304 should be partially active, and that second LVM 318 should be fully active. Second GP 310 of second GPU 304 and second LVM 318 should be active to provide the enhanced graphics processing capabilities and second DC 312 should be inactive because it will not be driving a display. A transition from environment 400 to environment 300 may include transitioning from a low power state to a partially active state (e.g., second GPU 304 being partially active). For example, such a transition may include switching second GPU 304 from a low power state in which its settings are set to sub-operational levels to normal levels, e.g., by increasing the clock frequencies and operating voltages of second GPU 304, activating one or more PLLs, activating one or more I/O pads, activating second LVM 318, enabling memory accesses from second LVM 318, and/or disabling a self-refresh mode of second LVM 318.

Figure 5:
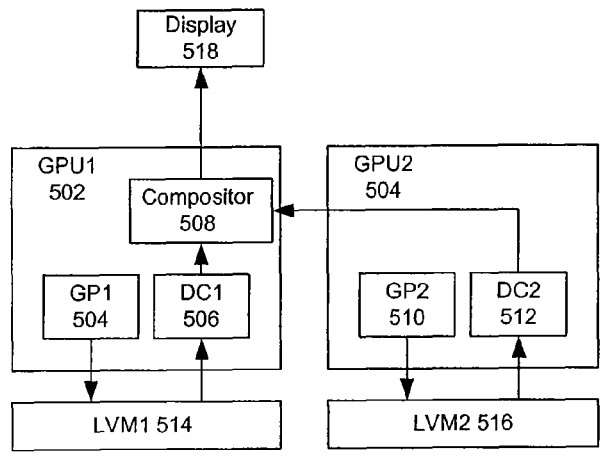

FIG. 5 shows a computing environment 500, according to an embodiment of the present invention. Computing environment 500 includes first and second GPUs 502 and 504, first and second LVMs 514 and 516, and a display 518. First GPU 502 is coupled to display 518 and a first LVM 514. Second GPU 504 is coupled to second LVM 516. First GPU 502 includes a first GP 504, a first DC 506, and a compositor 508. Second GPU 504 includes a second GP 510 and a second DC 512. In an embodiment, display 518 is substantially similar to display 314, described with reference to FIG. 3.

Similar to computing environment 300, computing environment 500 may be used when an application, e.g., a graphics-intensive game, is being run that requires or benefits from increased processing power. Compositor 508 assembles images generated by first and second DCs 506 and 512 into a single image that can be sent to display 518. Thus, compositor 508 allows both first display controller 506 and second display controller 512 to be utilized for generating display images. Unlike second DC 312 of second GPU 304 in computing environment 300, then, second DC 512 is kept active because compositor 508 allows its output to be utilized in the final display.

Figure 6:
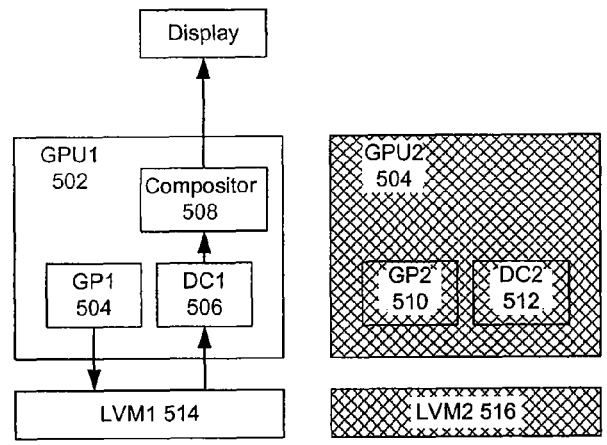

FIG. 6 shows a computing environment 600, according to an embodiment of the present invention. Computing environment 600 illustrates a transition in response to a detected event. For example, configuration manager 222 receives information indicating that the application requiring or benefiting from increased graphics processing capabilities has been or will be terminated. Having determined that increased graphics processing capabilities are no longer required, configuration manager 222 assigns all graphics tasks to first GPU 502. Power manager 224 receives the assigned responsibilities and determines that first GPU 502 and first LVM 514 should remain fully active and that second GPU 504 and second LVM 516 should be switched to low power states.

As would be understood by those skilled in the relevant art(s) based on the description herein, configuration manager 222 and power manager 224 can cause a transition from computing environment 600 to computing environment 500 in a similar manner in response to an application requiring or benefiting from enhanced graphics processing capabilities being started.

Figure 7:
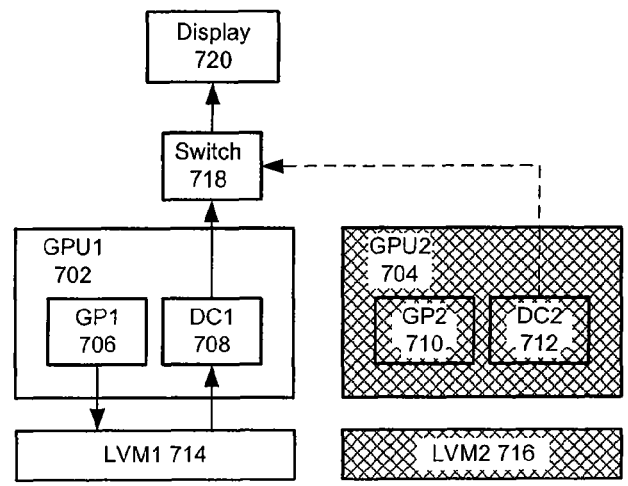

FIG. 7 shows a computing environment 700, according to an embodiment of the present invention. Computing environment 700 includes first and second GPUs 702 and 704, first and second LVMs 714 and 716, a switch 718, and a display 720. In an embodiment, display 720 is substantially similar to display 314 described with reference to FIG. 3. First GPU 702 includes a first GP 706 and a first DC 708. Second GPU 704 includes a second GP 710 and a second DC 712. First and second GPUs 702 and 704 are coupled to first and second LVMs 714 and 716, respectively.

Computing environment 700 can be especially suited for mobile applications. In mobile applications, the system that provides power to the components of computing environment often switches between AC (e.g., wall socket) and DC (e.g., battery) power. For example, a laptop may switch between AC and DC power depending on whether the power supply is connected to a wall socket. Switch 718 is configured to switch between the display outputs of first DC 708 and second DC 712. For example, first GPU 702 may be a high performance GPU that also has high power consumption. In contrast, second GPU 704 can be a GPU having comparably lower performance and lower power consumption, such as an integrated graphics device of an integrated chip set.

Computing environment 700 shows the system when AC power is available. In such a case the higher performance first GPU 702 is used. In such an embodiment, second GPU 704 and second memory 716 are not used, and thus are in low power states.

Figure 8:
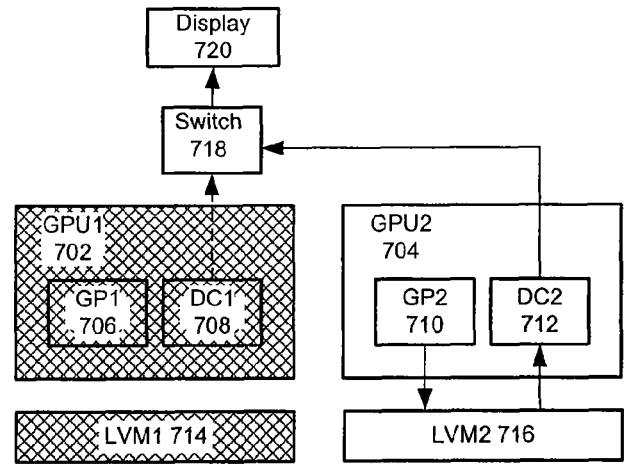

FIG. 8 shows a computing environment 800, according to an embodiment of the present invention. Specifically, computing environment 800 reflects changes after a power event, i.e., a switch from AC to DC power, is detected. Configuration manager 222 receives information indicating that such a power switch has occurred and assigns all graphics tasks to the lower performance second GPU 704. Power manager 224 receives the assigned responsibilities and determines that first GPU 702 along with first LVM 714 should be switched to a low power state and that second GPU 704 and second LVM 716 should become fully active. Switch 718 switches the input for display 720 from first GPU 702 to second GPU 704.

Thus, FIGS. 7 and 8 illustrate a transition in response to the system changing from AC to DC power. As would be understood by those skilled in the relevant arts based on the description herein, a transition from computing environment 800 to computing environment 700 may be similarly completed in response to a switch from DC power to AC power.

Figure 9:
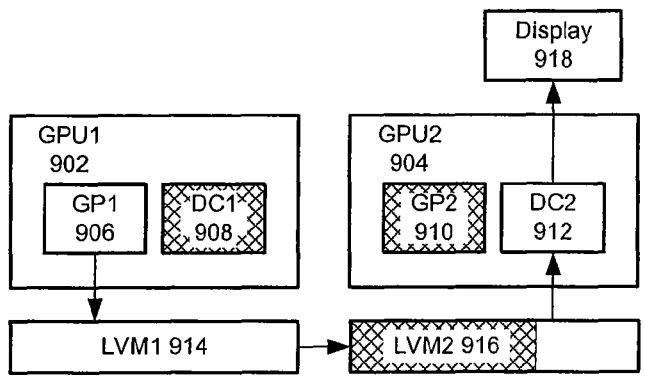

FIG. 9 shows a computing environment 900, according to an embodiment of the present invention. Computing environment 900 includes first and second GPUs 902 and 904, first and second LVMs 914 and 916, and a display 918. In an embodiment, display 918 is substantially similar to display 314 described with reference to FIG. 3. First GPU 902 includes a first GP 906 and a first DC 908. Second GPU 904 includes a second GP 910 and a second DC 912. Similar to first and second GPUs 702 and 704 described with reference to FIGS. 7 and 8, first GPU 902 may be a high performance and correspondingly high power consuming device and second GPU 904 may be a relatively low performance and low power consuming device.

Figure 10:
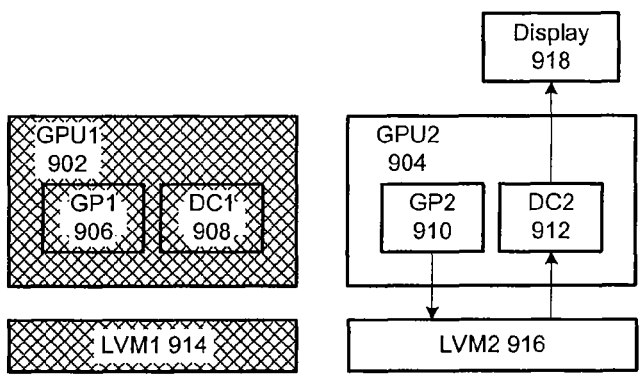

Instead of using a switch 718 to switch between high and low performance devices, in the embodiments of FIGS. 9 and 10 memories 914 and 916 are used in a way to allow for switching between first GP 906 and second GP 910. Computing environment 900 shows the system when it is being powered by AC power. Thus, the higher performance first GPU 902 and its GP 906 are used to handle the graphics processing tasks. The output of first GPU 902 is written to first LVM 914 and copied from first LVM 914 to second LVM 916. DC 912 accesses the output in second LVM 916 when drives display 918. Because all of the graphics processing tasks are assigned to first GP 906 of first GPU 902, second GP 910 of second GPU 904 is deactivated. Similarly, since first DC of first GPU 902 is not coupled to display 918, it is not used, and therefore left inactive. Furthermore, only a portion of second memory 916 is required to transfer the output of first GP 906 from first GPU 902 to second GPU 904. For example, only the portion of second LVM 916 that is required for the frame buffer is left active. Unused portions of second LVM 916 are switched to a low power state.

FIG. 10 shows a computing environment 1000, according to an embodiment of the present invention. Similar to computing environment 800 shown in FIG. 8, computing environment 1000 illustrates a transition from AC power to DC power. Configuration manager 222 receives information indicating that the power source has been switched from AC power to DC power and assigns all graphics tasks to second GPU 904. Second GPU 904 will handle both graphics processing and display tasks. Thus, first GPU 902 will be completely unused and second GPU 904 will be fully used. Power manager 224 receives this information and determines that first GPU 902 and first memory 914 should be switched to a low power state and that second GPU 904 and second LVM 916 should be fully active.

Thus, FIGS. 9 and 10 illustrate a power-state transition based on a detected event in which the power source is switched from AC to DC power. As would be understood by those skilled in the relevant arts based on the description herein, configuration manager 222 and power manager 224 can be used to transition from computing environment 1000 to computing environment 900 in response to a switch from DC to AC power in a similar manner as described above.

Figure 11:
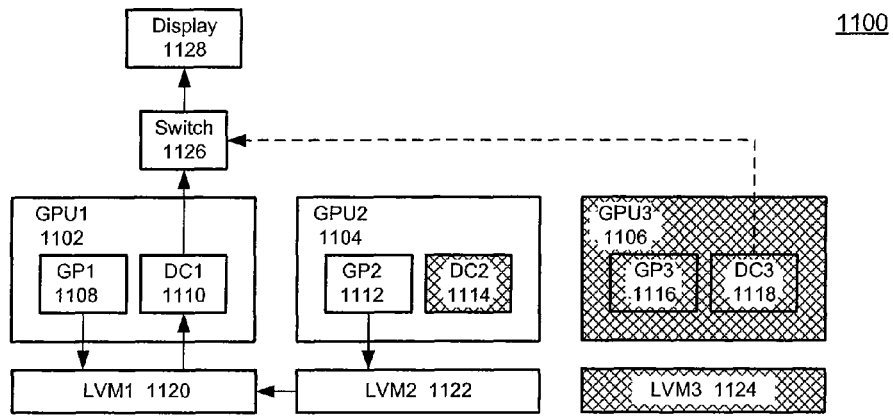

FIG. 11 shows a computing environment 1100, according to an embodiment of the present invention. Computing environment 1100 includes a first GPU 1102, a second GPU 1104, a third GPU 1106, a first LVM 1120, a second LVM 1122, a third LVM 1124, a switch 1126, and a display 1128. Switch 1126 can be generally similar to switch 718 described with reference to FIGS. 7 and 8. Display 1128 can be substantially similar to display 314 described with reference to FIG. 3.

In an embodiment, computing environment 1100 may be used in mobile applications where the power supply is switched between AC and DC power. First and second GPUs 1102 and 1104 are high performance and high power consuming devices. Third GPU 1106 is a comparably lower performance and lower power consuming device.

Computing environment 1100 is an environment when an application requiring or benefiting from high graphics processing capabilities is being run on a system powered by AC power. Thus, both of first and second GPs 1108 and 1112 of first and second GPUs 1102 and 1104, respectively, are active. Because second DC 1114 of second GPU 1104 is not coupled to switch 1126 this circuit block of second GPU 1104 is deactivated. First and second GPs 1108 and 1112 of GPUs 1102 and 1104, respectively, are used in parallel to handle graphics processing tasks. Information generated by second GP 1112 is sent to first GPU 1102 in a manner similar to as described above with reference to FIGS. 3 and 4. Switch 1126 is configured to switch between first DC 1110 and third DC 1118 based on whether the system is being driven by AC or DC power.

Figure 12:
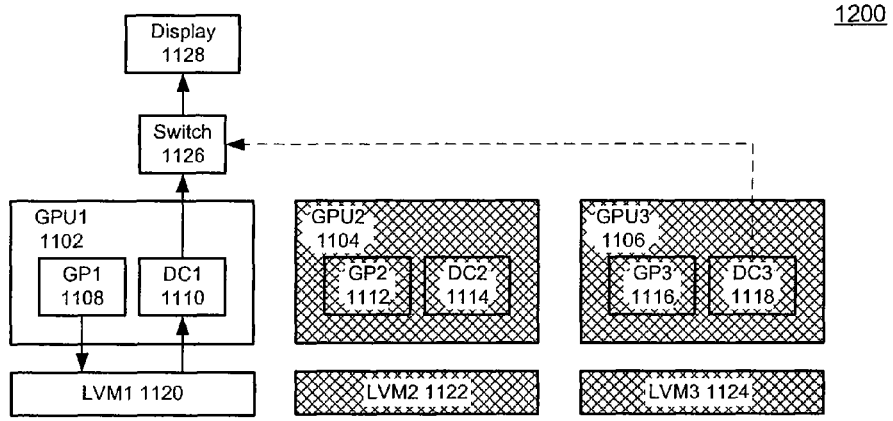

FIG. 12 shows a computing environment 1200, according to an embodiment of the present invention. Specifically, computing environment 1200 shows a transition after an event, e.g., the ending of the application that required or benefited from the increased graphics processing capabilities, is detected. Configuration manager 222 receives information indicating that the application has been terminated and that increased graphics processing capabilities are no longer required. Based on this information, configuration manager 222 assigns all graphics processing and display tasks to first GPU 1102. Based on this assignment, power manager 224 determines that since second and third GPUs 1104 and 1106 are not used, they and their associated memories can be switched to low power states. Because first GPU 1102 has both graphics processing and display controlling responsibilities, first GP 1108 and first DC 1110 of first GPU 1102 are kept active.

Figure 13:
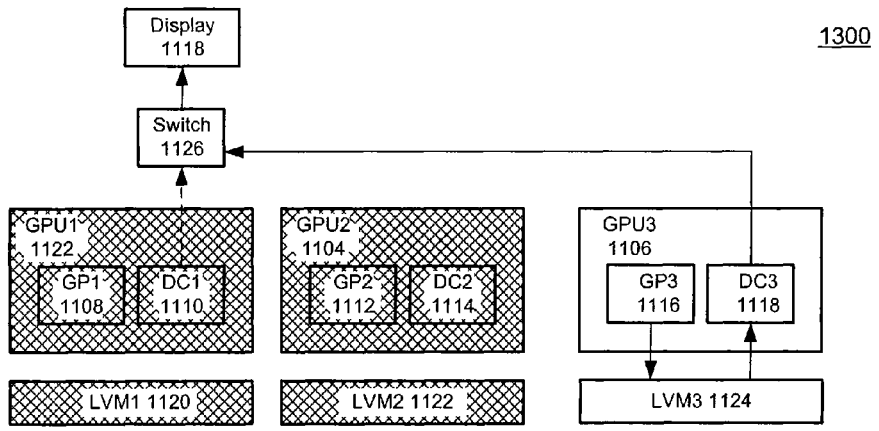

FIG. 13 shows a computer environment 1300, according to an embodiment of the present invention. Specifically, computing environment 1300 shows a transition based on a switch from AC power to DC power. Configuration manager 222 receives information regarding the switch from AC to DC power and assigns all graphics processing and display controlling tasks to third GPU 1106. Based on this assignment, power manager 224 determines that first and second GPUs 1102 and 1104 and corresponding LVMs 1120 and 1122 should be switched to a low power state because they are not being used. Third GPU 1106 and associated memory 1124 should be kept active because display and graphics processing tasks are assigned to it.

As would be understood by those skilled in the relevant arts based on the description herein, configuration manager 222 and power manager 224 can be used to switch between any of the hardware configurations shown in FIGS. 11-13. For example, the hardware configuration shown in FIG. 13 can be switched to either of the hardware configurations shown in FIG. 11 or FIG. 12 based on appropriate detected events. For example, for a transition from DC power to AC power can result in a transition from environment 1300 to environment 1200. A graphics-intensive application starting and a switch to AC power can result in a transition from environment 1300 to environment 1100.

Figure 14:
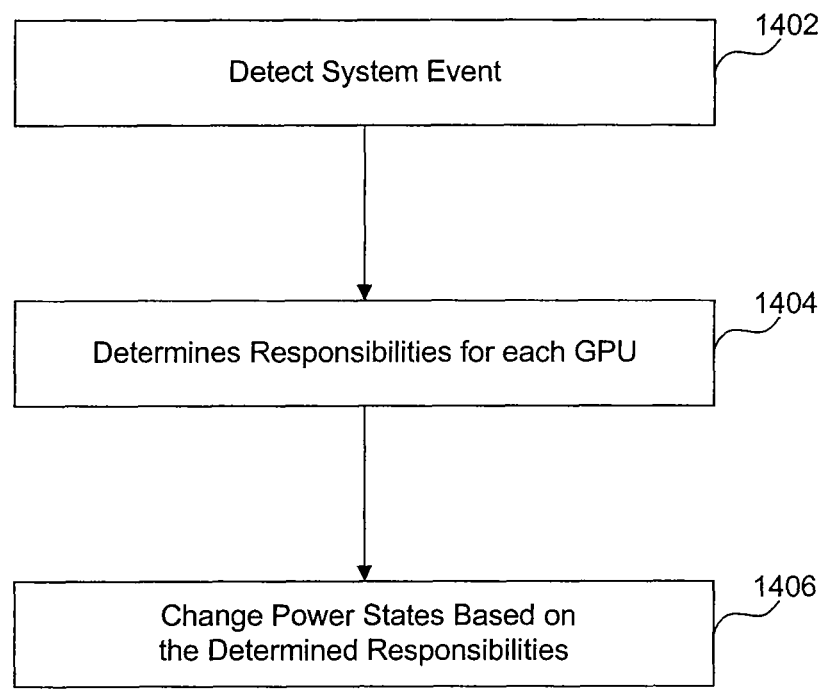
FIG. 14 is a flowchart of an exemplary method of managing power in multi-graphics processing unit systems, according to an embodiment of the present invention The present invention will be described with reference to the accompanying drawings. Generally, the drawing in which an element first appears is typically indicated by the leftmost digit(s) in the corresponding reference number.

FIG. 14 is a flowchart of an exemplary method 1400 of managing power in multi-GPU systems, according to the present invention. Other structural and operational embodiments will be apparent to persons skilled in the relevant art(s) based on the following discussion. Flowchart 1400 is described with reference to the embodiment of FIG. 2. However, flowchart 1400 is not limited to that embodiment. The steps shown in FIG. 14 do not necessarily have to occur in the order shown. The steps of FIG. 14 are described in detail below.

In step 1402, a system event is detected. For example, a system event can include the start or exit of an application requiring or benefiting from increased processing power, e.g., the start or exit of a graphics-intensive game. A system event can also include a switch from AC to DC power, e.g., in mobile applications. In other embodiments, a system event can also include other events that are irrelevant to GPU configuration management. In the latter case the event is ignored.

In step 1404, responsibilities for each GPU are determined. For example, in FIG. 2, configuration manager 222 can determine responsibilities for each GPU based on the detected system event. Configuration manager can, for example, assign all graphics tasks, some graphics tasks (e.g., graphics processing or display), or no tasks to a GPU.

In step 1406, power states of each GPU in the system are determined based on the determined responsibilities. For example, in FIG. 2, power manager 224 receives the determined responsibilities from configuration manager 222 and determines power states for each GPU. For example, GPUs may be shifted to a low power state, a partially active state, or a fully active state.

Instructions executed by the logic to perform aspects of the present invention can be coded in a variety of programming languages, such as C and C++, and compiled into object code that can be executed by the logic or other device.

Aspects of the present invention can be stored, in whole or in part, on a computer readable media. The instructions stored on the computer readable media can adapt a processor to perform the invention, in whole or in part.

Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   detecting an event;
   assigning, based on at least the detected event, a first set of graphics tasks to a first processor and a second set of graphics processing tasks to a second processor, the first processor comprising a plurality of functional blocks, wherein the first set of graphics tasks is different from the second set of graphics tasks; and
   setting a power state of the first processor to a first state and a power state of the second processor to a second state based on the first and second sets of graphics tasks responsibilities, respectively,
   wherein in the first state is a partially active state in which at least a first functional block of the plurality of functional blocks is active and at least a second functional block of the plurality of functional blocks is in a sub-operational power state, wherein the sub-operational power state is a reduced operating frequency state and an operating voltage is set to maintain the reduced operating frequency.

2. The method of claim 1, wherein the detecting comprises detecting that an application requiring increased graphics processor capabilities will be executed or exited.

3. The method of claim 1, wherein the detecting comprises detecting that a system configured to provide power to the first and second processors has been switched from AC power to DC power or from DC power to AC power.

4. The method of claim 1, wherein the setting comprises at least one of:
   reducing an operating voltage of a portion of the first processor, reducing a clock frequency of the first processor, deactivating one or more phased-locked loops of the first processor, deactivating an input/output pad of the first processor, deactivating a portion of a memory coupled to the first processor, and switching the memory coupled to the first processor into self-refresh mode.

5. The method of claim 1, wherein the setting comprises at least one of:
increasing an operating voltage of a portion of the first processor, increasing a clock frequency of the first processor, activating one or more phased-locked loops of the first processor, activating an input/output pad of the first processor, activating a portion of a memory coupled to the first processor, and disabling self-refresh mode of the memory coupled to the first processor.

6. The method of claim 1, wherein the second functional block is a graphics processor.

7. The method of claim 1, wherein the second functional block is a display controller.

8. The method of claim 1, wherein the first set of graphics processing tasks is at least one of graphics processor or display.

9. The method of claim 1, wherein the event comprises at least one of a change in power source, input from a user, and the start or stop of an application.

10. The method of claim 1, wherein the setting further comprises switching a portion of a local memory of the first processor to a low power state.

11. The method of claim 1, wherein the first and second sets of graphics tasks comprise at least one of:
rendering images;
rendering videos; and
displaying a graphics output.

12. A system for managing power, comprising:
a first processor; and
a memory in communication with said first processor, said memory for storing a plurality of processor instructions for directing said first processor to:
detect an event;
assign, based on at least the detected event, a first set of graphics tasks to a second processor and a second set of graphics tasks to a third processor, the second processor comprising a plurality of functional blocks, wherein the first set of graphics tasks is different than the second set of graphics tasks responsibility; and
set a power state of the second processor to a first state and a power state of the third processor to a second state based on the first and second sets of graphics tasks, respectively,
wherein in the first state is a partially-active state in which at least a first functional block of the plurality of functional blocks is active and at least a second functional block of the plurality of functional blocks is in a sub-operational power state, wherein the sub-operational power state is a reduced operating frequency state and an operating voltage is set to maintain the reduced operating frequency.

13. The system of claim 12, wherein the first processor is operable to detect that an application requiring increased graphics processor capabilities will be executed or exited.

14. The system of claim 12, wherein the first processor is operable to detect that a system configured to provide power to the second and third processors has been switched from AC power to DC power or from DC power to AC power.

15. The system of claim 12, wherein the first processor operable to set comprises at least one of:
reducing an operating voltage of a portion of the second processor, reducing a clock frequency of the second processor, deactivating one or more phased-locked loops of the second processor, deactivating an input/output pad of the second processor, deactivating a portion of a memory coupled to the second processor, and switching the memory coupled to the second processor into self-refresh mode.

16. The system of claim 12, wherein the first processor operable to set comprises at least one of:
increasing an operating voltage of a portion of the second processor, increasing a clock frequency of the second processor, activating one or more phased-locked loops of the second processor, activating an input/output pad of the second processor, activating a portion of a memory coupled to the second processor, and disabling self-refresh mode of the memory coupled to the second processor.

17. The system of claim 12, wherein the first set of graphics processing tasks is at least one of graphics processor and display.

18. The system of claim 12, wherein the second functional block is a graphics processor.

19. The system of claim 12, wherein the second functional block is a display controller.

20. The system of claim 12, wherein the event comprises at least one of a change in power source, input from a user, and the start or stop of an application.

21. The system of claim 12, wherein the first and second sets of graphics tasks comprise at least one of:
rendering images;
rendering videos; and
displaying a graphics output.

22. A method, comprising:
detecting an event;
assigning, based on at least the detected event, a first set of graphics tasks to a first processor and a second set of graphics tasks to a second processor, the first processor comprising a plurality of functional blocks, wherein the first set of graphics tasks is different from the second set of graphics tasks; and
switching a portion of a local memory of the first processor to a low power state based on the first set of graphics tasks, wherein the low power state is a reduced operating frequency state and an operating voltage is set to maintain the reduced operating frequency.

23. The method of claim 22, wherein the first and second sets of graphics tasks comprise at least one of:
rendering images;
rendering videos; and
displaying a graphics output.

* * * * *